United States Patent
Mayyuri et al.

(10) Patent No.: US 11,665,634 B2
(45) Date of Patent: May 30, 2023

(54) INTERFACE SELECTION USING DOMAIN NAME SERVICE (DNS) ROUND TRIP TIME (RTT)

(71) Applicant: QUALCOMM Incorporated, San Diego, CA (US)

(72) Inventors: Vijaya Datta Mayyuri, San Diego, CA (US); Ajit Chourasia, San Diego, CA (US); An Chen, San Diego, CA (US); Jaikanth Krishnaswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/148,463

(22) Filed: Jan. 13, 2021

(65) Prior Publication Data

US 2021/0282083 A1 Sep. 9, 2021

Related U.S. Application Data

(60) Provisional application No. 62/986,568, filed on Mar. 6, 2020.

(51) Int. Cl.
| | |
|---|---|
| *H04W 56/00* | (2009.01) |
| *H04W 48/18* | (2009.01) |
| *H04W 24/08* | (2009.01) |
| *H04L 43/0864* | (2022.01) |
| *G06F 16/22* | (2019.01) |
| *H04L 61/256* | (2022.01) |
| *H04L 61/4511* | (2022.01) |
| *H04L 61/5007* | (2022.01) |

(52) U.S. Cl.
CPC ............ *H04W 48/18* (2013.01); *G06F 16/22* (2019.01); *H04L 43/0864* (2013.01); *H04L 61/256* (2013.01); *H04L 61/4511* (2022.05); *H04L 61/5007* (2022.05); *H04W 24/08* (2013.01)

(58) Field of Classification Search
CPC ....... H04W 48/18; H04W 24/08; G04F 16/22; H04L 61/5007; H04L 61/4511; H04L 43/0864; H04L 61/256
USPC .......................................................... 370/252
See application file for complete search history.

(56) References Cited

U.S. PATENT DOCUMENTS

| | | | |
|---|---|---|---|
| 6,480,508 B1* | 11/2002 | Mwikalo | H04L 61/59 |
| | | | 709/245 |
| 11,122,004 B1* | 9/2021 | Kaczmarek | H04L 61/106 |
| 2008/0062997 A1* | 3/2008 | Nix | H04L 61/4511 |
| | | | 370/395.2 |
| 2015/0319097 A1* | 11/2015 | Hyatt | H04L 12/6418 |
| | | | 709/224 |
| 2018/0041470 A1* | 2/2018 | Schultz | H04L 47/24 |
| 2020/0007628 A1* | 1/2020 | Arunachalam | H04W 48/14 |
| 2020/0329008 A1* | 10/2020 | Dao | G06F 16/953 |
| 2021/0176205 A1* | 6/2021 | Mutnuru | H04L 43/0852 |
| 2021/0345221 A1* | 11/2021 | Huang | H04L 61/4511 |

* cited by examiner

*Primary Examiner* — Sai Ming Chan
(74) *Attorney, Agent, or Firm* — Seyfarth Shaw LLP

(57) ABSTRACT

A method of wireless communication by a wireless device calculates a first latency for a first wireless interface using a DNS (domain name service) protocol. The method also calculates a second latency for a second wireless interface using the DNS protocol. The method stores the first latency and the second latency in a database; and selects the first interface or the second interface based on the calculated first latency and second latency.

28 Claims, 14 Drawing Sheets

| Query time (UNIX time-secs) | Wlan0 RTT (msec) | Wlan1 RTT (msec) | Rmnet_data0 RTT (msec) | Rmnet_data1 RTT (msec) | Query |
|---|---|---|---|---|---|
| 1582761600 | 15 | 12 | 20 | 21 | www.google.com |
| 1582761610 | 13 | 14 | 19 | 22 | www.yahoo.com |
| 1582761620 | 13 | 15 | 22 | 19 | www.gmail.com |

*FIG. 3*

| Local Time | Intf1 Info | Intf2 Info | Intf3 Info | Intf4 Info | Location | Foreground App | App Type | App Inference | User State | Outdoor/Indoor |
|---|---|---|---|---|---|---|---|---|---|---|
| 7am | Home Wifi | X | LTE | X | Home | Browser | Productivity | Test | Sitting | Indoor |
| 7:30am | X | | LTE | 5G NR | X | Audible | Entertainment | Audio | Driving | Outdoor |
| 8:00am | X | Public Wifi | LTE | 5G NR | Starbucks | WeChat | Social | VoIP | Sitting | Indoor |
| 12pm | X | Work Wifi | LTE | X | Work | WeChat | Social | Game | Sitting | Indoor |
| 4pm | X | | LTE | X | Moving | WeChat | Social | Game | Subway | Outdoor |
| 9pm | | | LTE | 5G NR | Moving | WeChat | Social | VoIP | Walking | Outdoor |

*FIG. 9*

INTERFACE SELECTION USING DOMAIN NAME SERVICE (DNS) ROUND TRIP TIME (RTT)

CROSS-REFERENCE TO RELATED APPLICATION

The present application claims the benefit of U.S. Provisional Patent Application No. 62/986,568, filed on Mar. 6, 2020, and titled "INTERFACE SELECTION USING DOMAIN NAME SERVICE (DNS) ROUND TRIP TIME (RTT)," the disclosure of which is expressly incorporated by reference in its entirety.

FIELD OF THE DISCLOSURE

Aspects of the present disclosure generally relate to wireless communications, and more particularly to interface selection using domain name service (DNS) round trip time (RTT).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

However, as the demand for mobile broadband access continues to increase, there exists a need for further improvements in wireless technologies, such as wireless local area network (WLAN), NR and LTE technologies. Preferably, these improvements should be applicable to other multiple access technologies and the telecommunications standards that employ these technologies.

Applications such as mobile-gaming, VoIP, and video calls are sensitive to network latency. Mobile devices are increasingly supporting multiple network interfaces at the same time (e.g., Wi-Fi and cellular simultaneously, dual Wi-Fi connectivity, etc.). In order to provide the best user experience for latency sensitive use cases, a mobile platform should profile all available network interfaces at any given point of time and pick the interface with the least network latency.

Latency over a network interface can be quantified by calculating a round trip time (RTT) in different ways. For example, the RTT can be calculated using internet control message protocol (ICMP) pings or with proprietary request/response messages to a server. Both of these approaches necessitate hosting a dedicated server. Hosting these dedicated servers is expensive and requires maintenance. Moreover, ICMP and custom protocols (e.g., ports) can be blocked by firewalls for denial of service reasons. It would be desirable to implement a more efficient method to estimate RTT to address these issues.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is an illustration of a round trip time (RTT) database, in accordance with various aspects of the present disclosure.

FIG. 9 is an illustration of an enhanced round trip time (RTT) database, in accordance with various aspects of the present disclosure.

DETAILED DESCRIPTION

Figure 1:
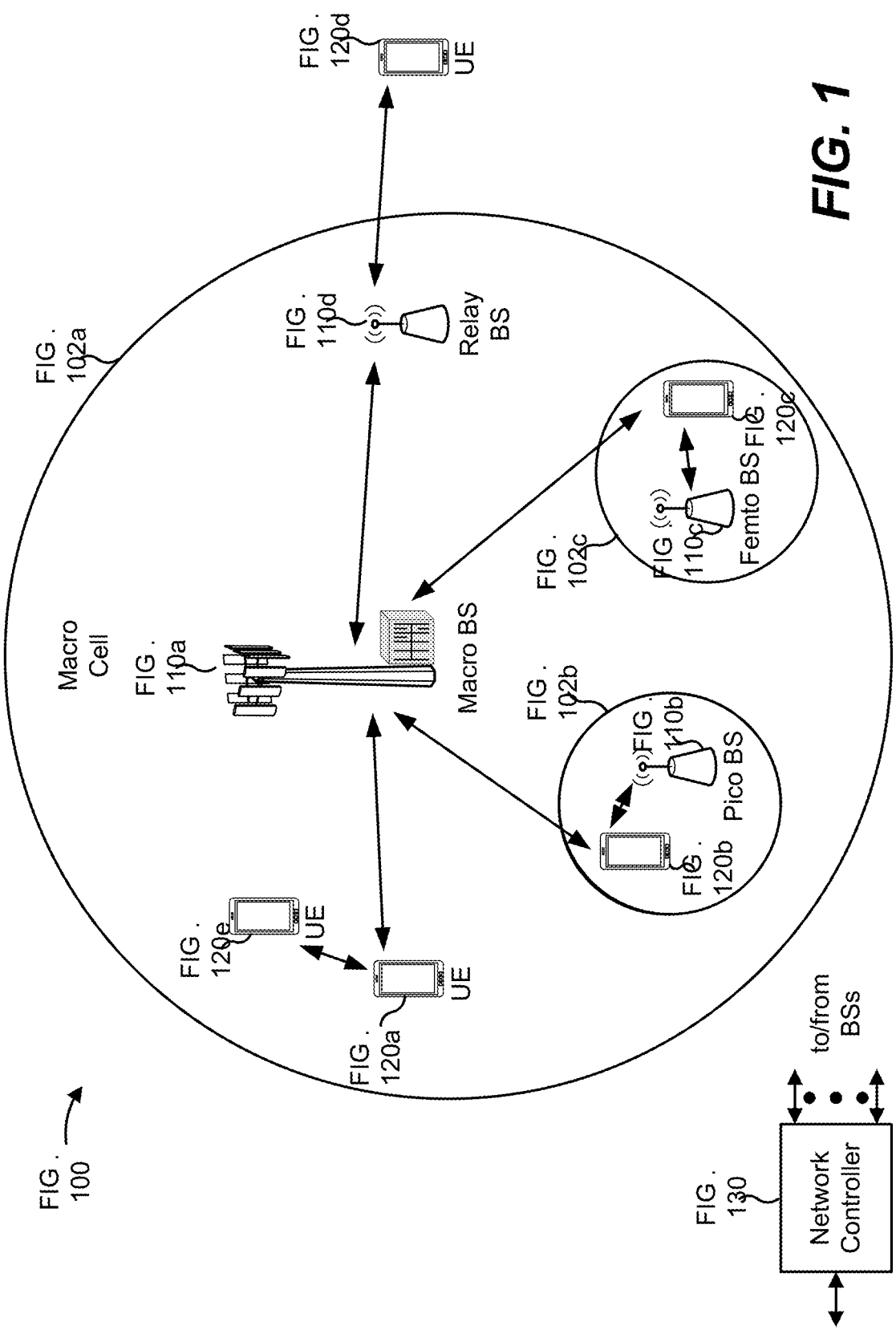
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings in this disclosure one skilled in the art should appreciate that the scope of the disclosure is intended to cover any aspect of the disclosure disclosed in this document, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Applications such as mobile-gaming, VoIP, and video calls are sensitive to network latency. Mobile devices are increasingly supporting multiple network interfaces at the same time (e.g., Wi-Fi and cellular simultaneously, dual Wi-Fi connectivity, etc.). In order to provide the best user experience for latency sensitive use cases, a user equipment (UE) should profile all available network interfaces at any given point of time and pick the interface with the least network latency.

Latency over a network interface can be quantified by calculating a round trip time (RTT) in different ways. For example, the RTT can be calculated using internet control message protocol (ICMP) pings or with proprietary request/response messages to a server. Both of these approaches necessitate hosting a dedicated server. Hosting these dedicated servers is expensive and requires maintenance. Moreover, ICMP and custom protocols (e.g., ports) can be blocked by firewalls. Methods to estimate RTT by using the domain name service (DNS) name resolution protocol are presented to address these issues. These methods are client based without specifying additional network hardware or any network infrastructure changes.

FIG. 1 is a block diagram conceptually illustrating an example of a wireless communications network in accordance with various aspects of the present disclosure. The network 100 may be a 5G or NR network or some other wireless network, such as an LTE network. Wireless network 100 may include a number of base stations (BSs) 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with a service subscription. A pico cell may cover a relatively small geographic area and may allow unrestricted access by UEs with a service subscription. A femto cell may cover a relatively small geographic area (e.g., a home) and may allow restricted access by UEs having an association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the changing location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as narrowband internet of things (NB-IoT) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. As indicated, FIG. 1 is provided merely as an example. Other examples may differ from what is described with regard to FIG. 1.

Figure 2:
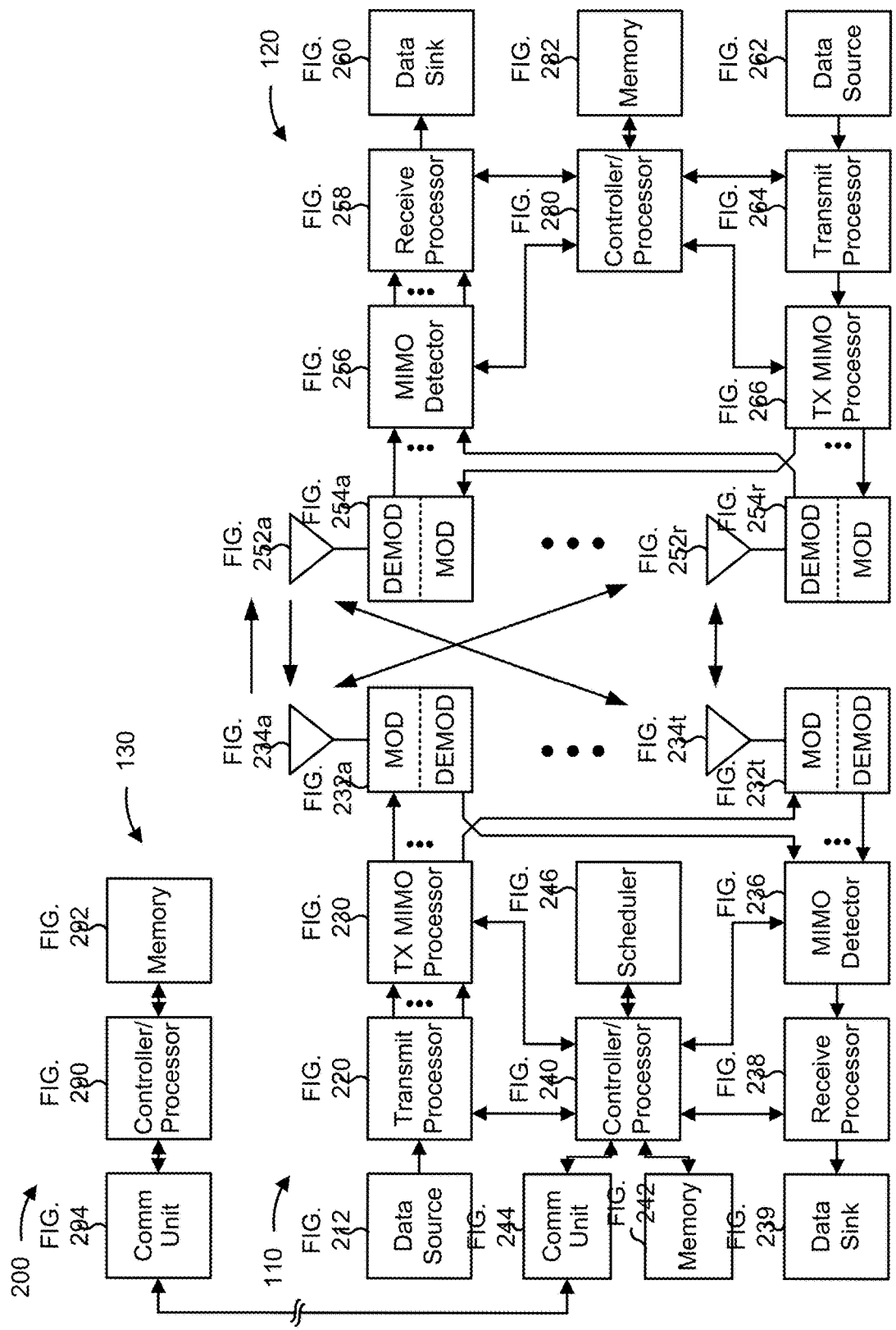
FIG. 2 is a block diagram conceptually illustrating an example of a base station in communication with a user equipment (UE) in a wireless communications network, in accordance with various aspects of the present disclosure.

FIG. 2 is a block diagram conceptually illustrating an example of a base station in communication with user equipment (UE) in a wireless communications network, in accordance with various aspects of the present disclosure. FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communications unit 244 and communicate to network controller 130 via communications unit 244. Network controller 130 may include communications unit 294, controller/processor 290, and memory 292.

Controller/processor 280 of UE 120, and/or any other component(s) of FIG. 2 may perform one or more interface selection techniques, as described in more detail elsewhere. For example, the controller/processor 280 of UE 120, and/or any other component(s) of FIG. 2 may perform or direct operations of, for example, the processes of FIGS. 6-8 and 10-13 and/or other processes as described. Memories 242 and 282 may store data and program codes for base station 110 and UE 120, respectively. A scheduler 246 may schedule UEs for data transmission on the downlink and/or uplink.

In some aspects, UE 120 may include means for calculating, means for storing, means for selecting, means for detecting, means for setting, means for measuring, and means for determining. Such means may include one or more components of the UE 120 described in connection with FIG. 2. As indicated, FIG. 2 is provided merely as an example. Other examples may differ from what is described with regard to FIG. 2.

In some cases, different types of devices supporting different types of applications and/or services may coexist in a cell. Examples of different types of devices include user equipment (UE) handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-everything (V2X) applications, and/or the like. Furthermore, in some cases, a single device may support different applications or services simultaneously.

Latency over a network interface can be quantified by calculating a round trip time (RTT) in different ways. For example, the RTT can be calculated using internet control message protocol (ICMP) pings or with proprietary request/response messages to a server. Both of these approaches necessitate hosting a dedicated server. Hosting these dedicated servers is expensive and requires maintenance. Moreover, ICMP and custom protocols (e.g., ports) can be blocked by firewalls. Methods to estimate RTT by using the domain name service (DNS) name resolution protocol are presented to address these issues.

According to aspects of the present disclosure, a method calculates an RTT of a given interface using the DNS protocol. The DNS is the backbone of the Internet. Every device connected to an Internet Protocol (IP) network communicates with a DNS server before communicating with any other device on the network. Most Internet Service Providers (ISPs) host their own DNS servers. There are also globally available DNS servers, such as 8.8.8.8 or 1.1.1.1. The present disclosure piggybacks on the DNS request/response handshake to calculate the RTT.

DNS query requests are sent over the network when an application requests a hostname resolution. A DNS resolver managed by the operating system (OS) is the entity that generates the DNS query message. Enhancements to the DNS resolver can enable the DNS resolver to measure latency (e.g., RTT) over the available interfaces. In addition to a modified DNS resolver, another process/entity can generate DNS queries for the sole purpose of calculating the RTT. This new entity will be referred to as a latency measurement daemon (LIVID). The RTTs computed by the DNS resolver or LIVID can be cached in a local database.

When an application attempts to resolve a hostname, the application invokes the DNS resolver (managed by the OS), which sends a DNS query request message to the primary DNS server via the default interface. DNS queries can also be generated by the LMD when RTT/latency data for all or a subset of interfaces is not available. According to the present disclosure, outgoing DNS queries over all (or a subset of) available interfaces are replicated. The result from the first interface that successfully resolves the query is returned to the application.

Most modern mobile operating systems maintain a DNS cache, where the results of the recent DNS queries are stored locally. A cache to store the DNS RTT associated with each DNS query can also be maintained. The RTT can be calculated as long as the DNS server responds to the query. The response to the query does not have to be successful. The cache entry keeps track of the interface on which the DNS resolution attempt was performed. The local DNS cache can be cleared/invalidated if new RTT measurements are desired.

The DNS RTT is calculated as the time difference between a DNS query and a corresponding response. Because an initial query takes longer for processing than subsequent queries, the initial query and response can be ignored for RTT calculation purposes. FIG. 3 is an illustration of a round trip time (RTT) database 300, in accordance with various aspects of the present disclosure. As seen in FIG. 3, the subsequent queries can be cached in a database. For example, a query timestamp and DNS RTT over each interface are stored in a local database, referred to as a DNS RTT database (DNS-RTT-DB). In FIG. 3, the query timestamp is stored in the first column. The RTTs for two WLAN interfaces Wlan0 and Wlan1 are stored in the second and third columns, respectively. The RTTs for two cellular networks Rmnet_data0 and Rmnet_data1 are stored in the fourth and fifth columns, respectively. Although cellular and WLAN network interfaces are shown in FIG. 3, any type of wireless network interface is contemplated, for example, Bluetooth®, tunnel interfaces, etc. Finally, the last column stores the actual hostname requested with the query.

In some aspects, an average latency is stored for each interface. For example, the second row of the database shows an average RTT of 15 milliseconds for Wlan0 and 12 milliseconds for Wlan1. The average latency may be based on most recent data, for example, calculated from a running average with a higher weight for more recent entries. The running average helps prevent unnecessary switching back and forth between interfaces. The database may be compressed, for example, by storing only the differences between reference points.

Figure 4:
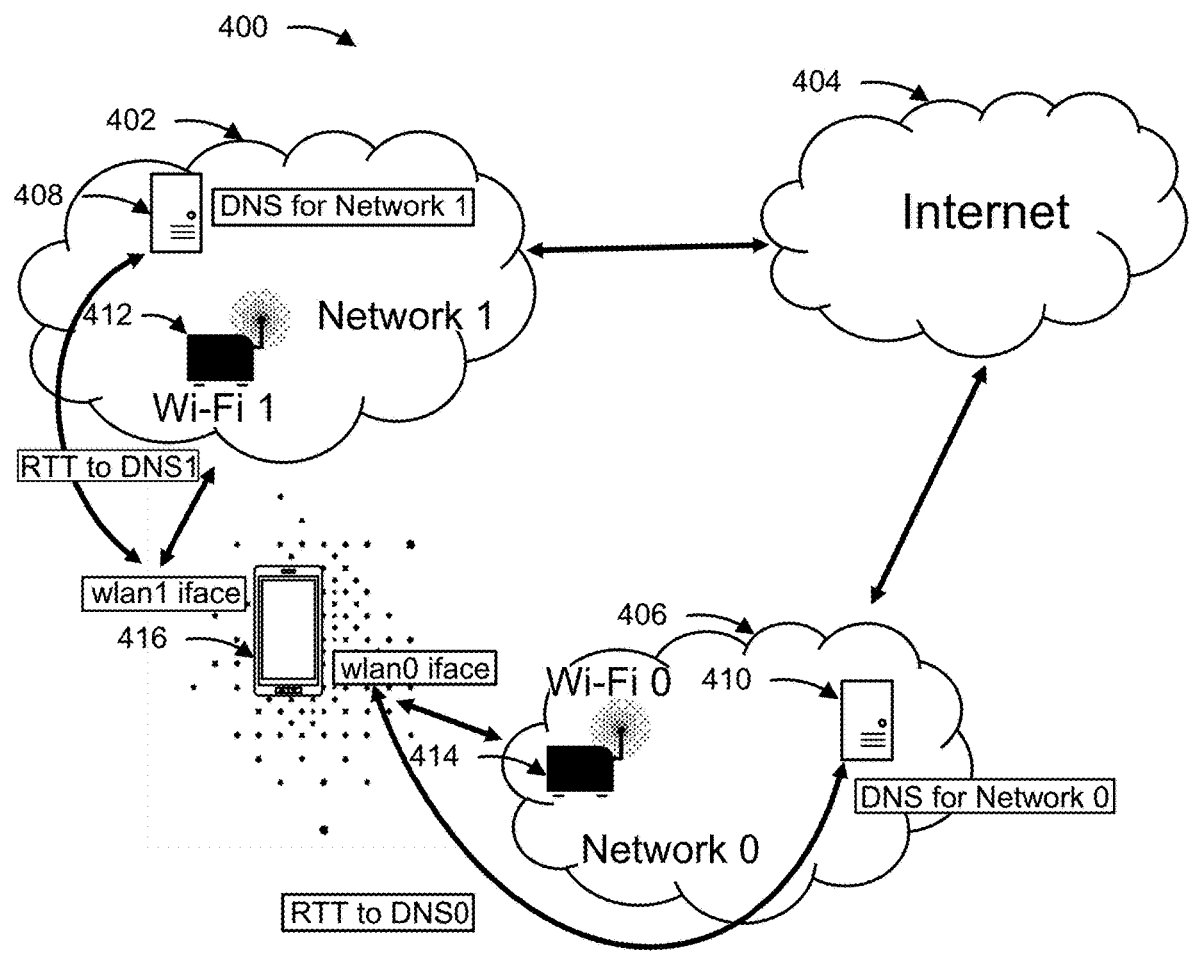
FIG. 4 is an illustration of round trip time (RTT) calculation with a local domain name service (DNS) server, in accordance with various aspects of the present disclosure.

FIG. 4 is an illustration of round trip time (RTT) calculation with a local domain name service (DNS) server, in accordance with various aspects of the present disclosure. A wireless communication system 400 includes a Network 0 406 in communication with the Internet 404. The Internet 404 is in communication with a Network 1 402. A UE 416 may be in communication with both the Network 0 406 and Network 1 402. The Network 0 406 includes a DNS server 410 and a Wi-Fi 0 network 414. Similarly, the Network 1 402 includes a DNS server 408 and a Wi-Fi 1 network 412. An IP address assignment procedure for an interface includes setting up the DNS server address for that interface. For example, if the Network 1 402 is used by the UE 416 the DNS server 408 handles the IP assignment process. If the Network 0 406 is used, then the DNS server 410 performs the IP assignment process. Most ISPs provide a local DNS server for their network, as shown in FIG. 4.

The UE 416 can send directed DNS queries to each local DNS server, such as the DNS server 408 for the Network 1 402 and the DNS server 410 for the Network 0 406 to compute the RTT. Thus, for Network 0 406, the query is sent to the server 'DNS for Network 0' 410 and the response is received from the server 'DNS for Network 0' 410. For the Network 1 402, the UE 416 sends the query to the 'DNS for Network 1' server 408 and receives a response from the 'DNS for Network 1' server 408. Because most of the variability in network latency can be attributed to the air interface section of the network, it is sufficient to compare the latency over the air interfaces for link selection. One advantage of this approach is that no single DNS server will be overloaded by the additional DNS requests generated for calculating RTT.

Figure 5:
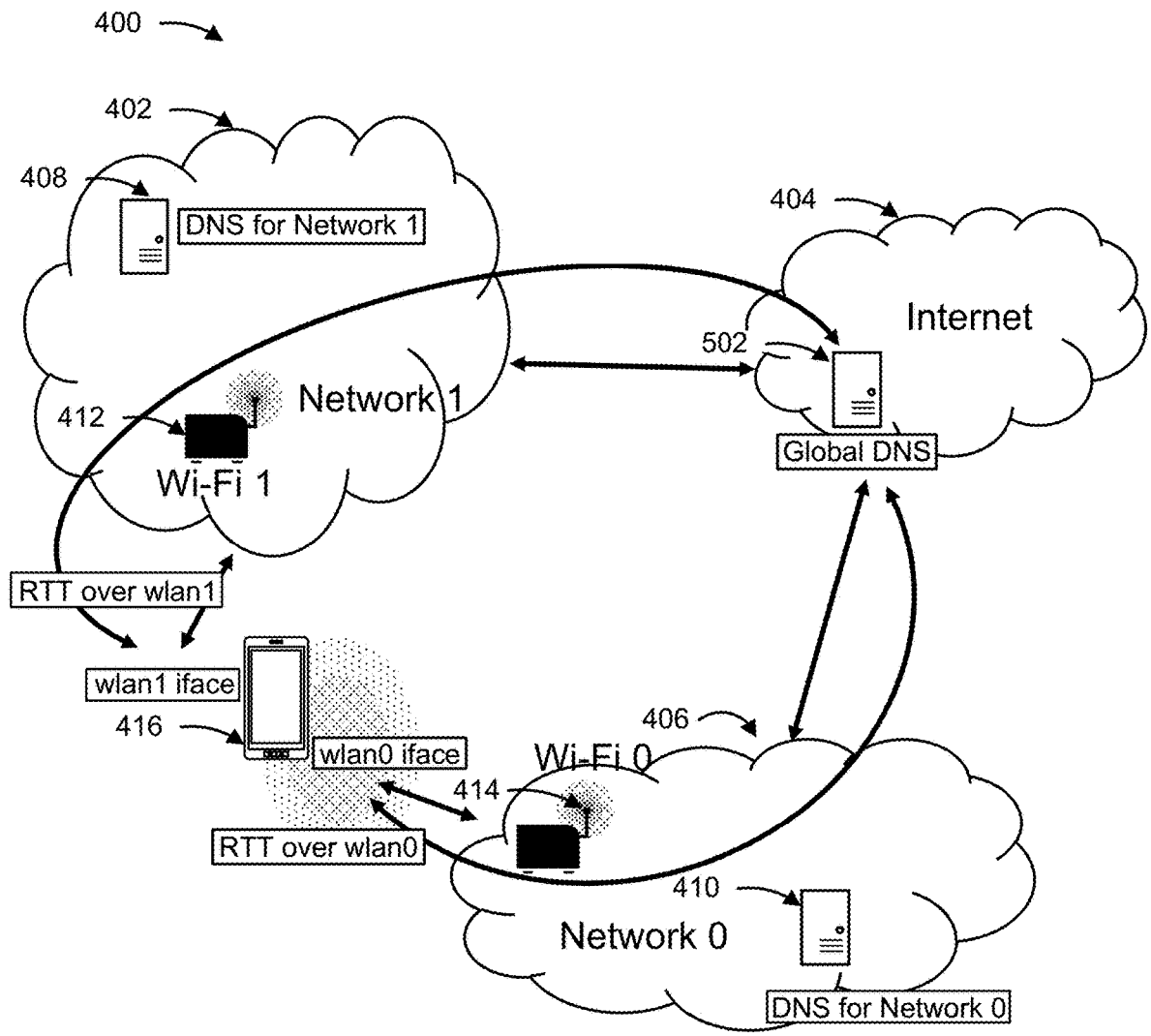
FIG. 5 is an illustration of round trip time (RTT) calculation with a global domain name service (DNS) server, in accordance with various aspects of the present disclosure.

FIG. 5 is an illustration of round trip time (RTT) calculation with a global domain name service (DNS) server, in accordance with various aspects of the present disclosure. The wireless communication system 400 of FIG. 4 is used to depict the RTT calculation with a global DNS server. The Internet 404 is in communication with two networks, the Network 0 406 and the Network 1 402. A global DNS server 502 is located on the Internet 404. In this aspect, a RTT over a given network interface can be calculated by sending DNS queries to a globally available DNS server 502. Because the UE 416 will be sending DNS queries to the same server from multiple interfaces, the RTT calculated over each interface is a more accurate measure of network latency. As seen in FIG. 5, the queries from the UE 416 for both the Network 0 406 and the Network 1 402 are sent to the same server, the Global DNS server 502. A response for both the Network 0 406 and the Network 1 402 is received from the Global DNS server 502 via the Network 0 406 and the Network 1 402.

Figure 6:
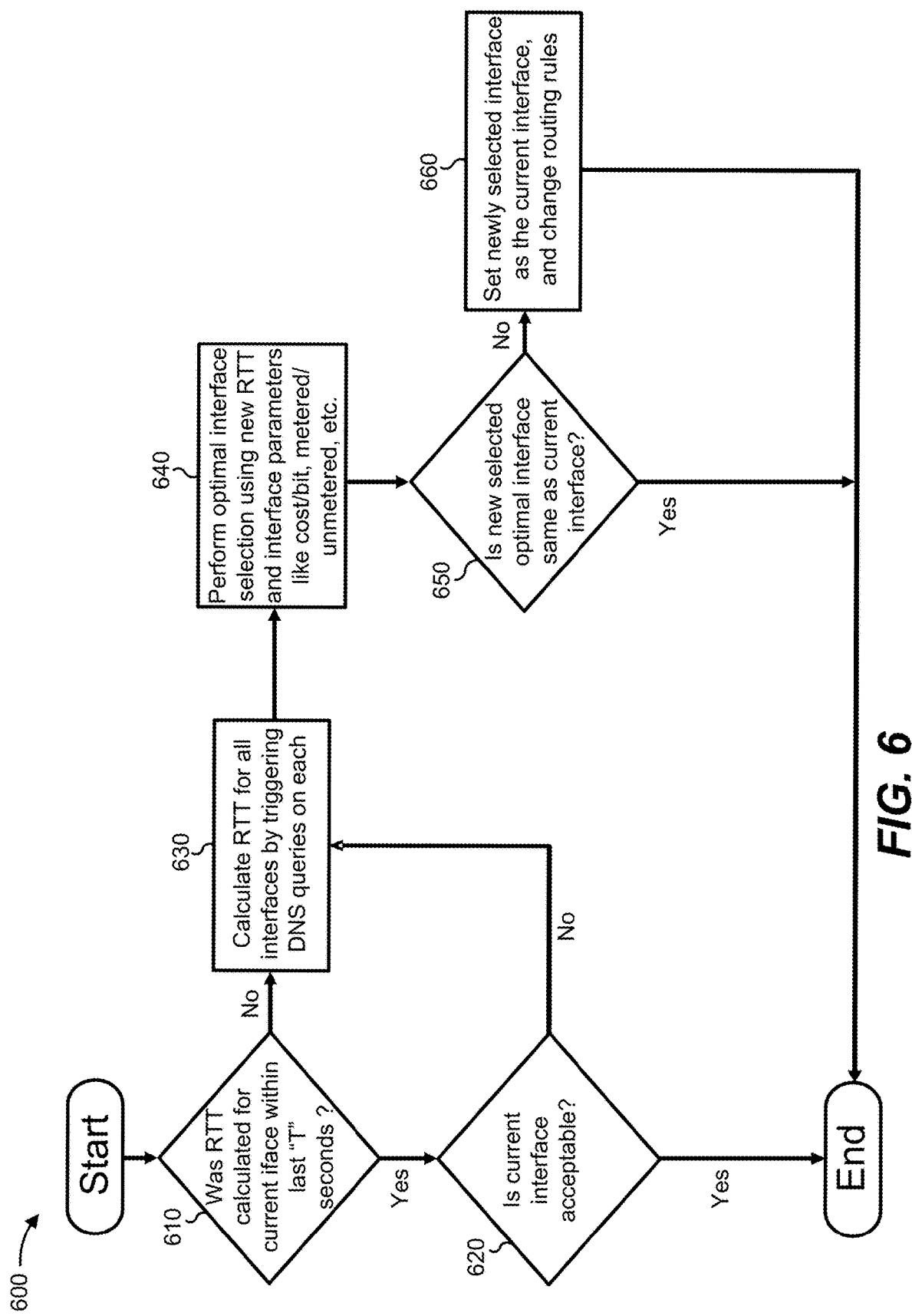
FIG. 6 is a flow diagram of a link selecting process with a domain name service (DNS) server, in accordance with various aspects of the present disclosure.

FIG. 6 is a flow diagram 600 of a link selecting process with a domain name service (DNS) server, in accordance with various aspects of the present disclosure. Initially, at block 610, it is determined whether a RTT was calculated for the current interface within the last 'T' seconds, where T can be a preset time period. If the RTT was recently calculated, at block 620, it is determined whether the current interface is acceptable. The current interface is the interface actively used as the default interface for the application. The current interface is considered to be acceptable if the current interface meets a minimum performance requirement of the application, for example, a minimum latency requirement of the application.

If the current interface is acceptable, the process ends. Otherwise, the logic flows to block 630. Similarly, if the RTT was not calculated recently enough (within the last 'T' seconds), the logic proceeds to block 630. At block 630, the logic calculates the RTT for all interfaces by triggering DNS queries on each interface. As discussed previously, the queries can be to either local or global DNS servers. The RTTs can be calculated when an application sends a DNS request as part of normal operation. Otherwise, if a request has not been sent in a long time, the latency measurement daemon (LMD) will generate a DNS request.

At block 640, interface evaluation occurs. That is, the newly calculated RTTs are examined, along with other criteria, such as the cost per bit of the interface, whether the interface is metered or unmetered, etc. The logic determines if a given interface is the best option among all available interfaces considering RTT, cost, etc.

At block 650, it is determined if the best interface (e.g., determined from block 640) is the same as the currently selected interface. If yes, the process ends. If not, the logic flows to block 660. At block 660, new routing rules are added to route the application data to the best interface, thus making it the current interface for the next iteration, and the process ends.

Figure 7:
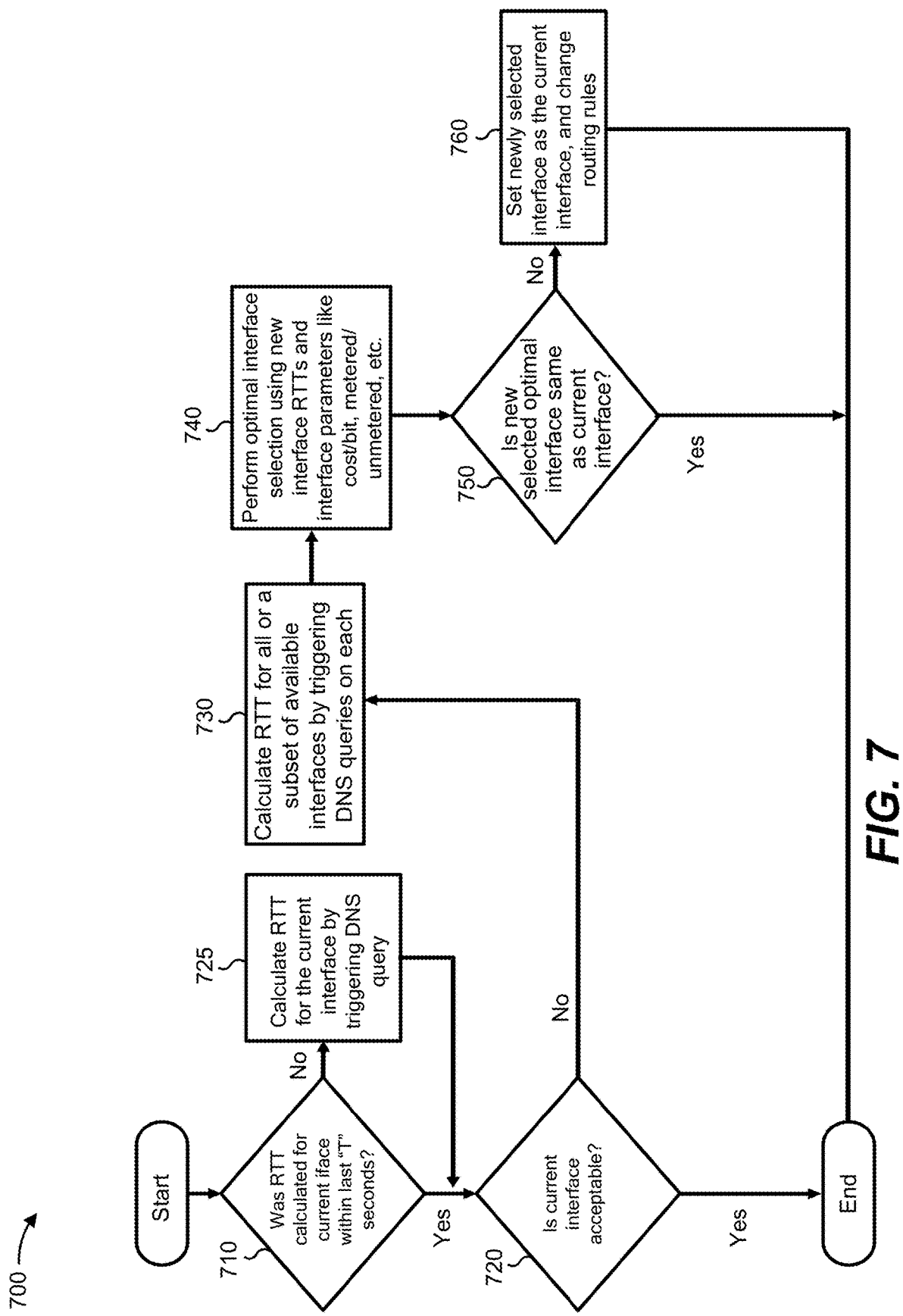
FIG. 7 is a flow diagram of another link selecting process with a domain name service (DNS) server, in accordance with various aspects of the present disclosure.

FIG. 7 is a flow diagram 700 of another link selecting process with a domain name service (DNS) server, in accordance with various aspects of the present disclosure. Initially, at block 710, it is determined whether an RTT was calculated for the current interface within the last 'T' seconds, where T can be a preset time period. If the RTT was recently calculated, at block 720, it is determined whether the current interface is acceptable. The current interface is the interface actively being used as the default interface for the application. The current interface is considered to be acceptable if the current interface meets a minimum performance requirement of the application, for example, a minimum latency requirement of the application. If the current interface is acceptable, the process ends. Otherwise, the logic flows to block 730.

If the RTT was not calculated recently enough (e.g., within the last 'T' seconds), the logic proceeds to block 725. At block 725, the RTT for the current interface is calculated by triggering a DNS query. The logic then proceeds to block 720.

At block 730, the logic calculates the RTT for a subset of interfaces by triggering DNS queries on each interface in the subset. As discussed previously, the queries can be to either local or global DNS servers. The RTTs can be calculated when an application sends a DNS request as part of normal operation. Otherwise, if a request has not been sent in a long time, the latency measurement daemon (LMD) will generate a DNS request. The subset is determined based on what type of interface is specified. For example, a Wi-Fi interface or a metered interface can be specified. This interface can be specified dynamically or can be statically assigned. The specifying can be from a user preference set via the user interface. Alternatively, it can be configured based on the use case/application for which the link selection is being performed. The entity making the setting can be the settings application or a service that monitors the active applications and sets policy based on the application use case.

At block 740, interface evaluation occurs. That is, the newly calculated RTTs are examined, along with other criteria, such as the cost per bit of the interface, whether the interface is metered or unmetered, etc. The logic determines if a given interface is the best option among all available interfaces considering RTT, cost, etc.

At block 750, it is determined if the best interface (e.g., determined from block 740) is the same as the currently selected interface. If yes, the process ends. If not, the logic flows to block 760. At block 760, new routing rules are added to route the application data to the best interface, thus making it the current interface for the next iteration, and the process ends.

When multiple network interfaces are available on a UE, one of the networks is designated as the default interface. All application traffic is by default routed via that interface. Generally, the DNS server associated with the default interface becomes the primary DNS server for the device. Even when applications are attempting to use multiple network interfaces concurrently, all DNS traffic is routed via the default network interface. This becomes a problem if the default network's performance starts deteriorating (e.g., DNS resolutions become the bottleneck for all other traffic). According to another aspect of the present disclosure, DNS traffic rerouting overcomes this issue.

According to this aspect, whenever a mobile device (e.g., UE) detects a new network interface, the UE will set the default/primary DNS address to a DNS server that can be reached from all of the connected networks. In other words, a globally available DNS server 502 is selected (e.g., a DNS server such as 8.8.8.8), as shown in FIG. 5. Because the DNS server can now be accessed via multiple interfaces, it can be determined if the first interface latency is deteriorating. Thus, after updating the primary DNS server, the mobile platform measures the latency over all available network interfaces and selects the interface with the least latency for all future DNS traffic. In addition to network latency, other parameters such as cost/bit, metered/unmetered, etc., can be considered when performing interface selection. The interface selection can be proceed as described above with respect to FIGS. 6 and 7.

Figure 8:
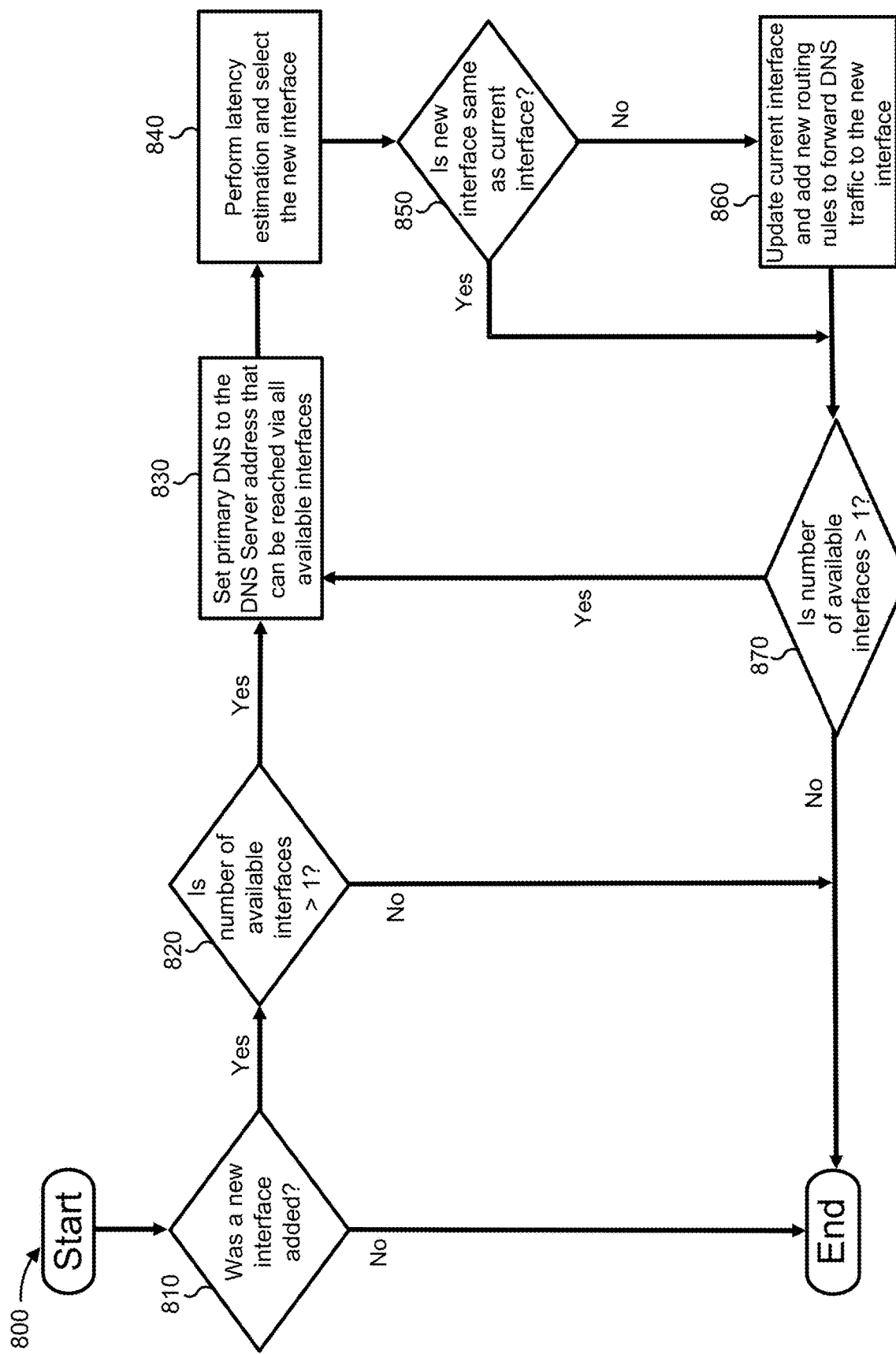
FIG. 8 is a flow diagram of a domain name service (DNS) traffic rerouting process, in accordance with various aspects of the present disclosure.

FIG. 8 is a flow diagram 800 of a domain name service (DNS) traffic rerouting process, in accordance with various aspects of the present disclosure. At block 810, it is determined whether a new interface was added. If not, the process ends. Otherwise, the logic proceeds to block 820. At block 820, it is determined whether more than one interface is currently available. If not, the process ends. Otherwise, the process proceeds to block 830.

At block 830, the primary DNS server is set to a globally available DNS server address. At block 840, a latency estimation occurs and a new interface is selected. At block 850, it is determined if the new interface is the same as the current interface. If so, the process flows to block 870, where it is determined if the number of available interfaces is greater than one. If not, the process ends. Otherwise, the process flows to block 860. At block 860, the current interface is updated and new routing rules are added, instructing DNS traffic to be forwarded via the new interface. At block 870, it is determined whether the number of available interfaces is greater than one. If so, the process returns to block 830. Otherwise, the process ends.

Although block 830 sets the primary DNS server to a globally available DNS server address, this step is optional. That is, the UE can continue to use the DNS servers (e.g., 408 and 410) provided by the local networks (e.g., 402 and 406). After link selection, the UE routes all the application DNS traffic to the newly selected interface and its DNS server. This procedure works even if some of the connected interfaces do not provide a DNS server.

Contextual awareness can speed up interface selection. Having knowledge of which application, and when and where the application is being used by the end user, is important information to handset manufacturers. This information can help the manufacturers to offer the end user a differentiated user experience by selecting the best wireless link for connectivity. The selection can be based on the foreground application requirements, reducing the disruption of connectivity, and reducing the latency when there is an intersystem handoff from indoor to outdoor networks and from one type of cellular network to another. In addition, data service charges can be accounted for to provide the user with a better user experience without excessive costs.

The present disclosure leverages the DNS RTT database (DNS-RTT-DB), discussed with respect to FIG. 3, and context aware information to offer a better user experience to an end user. The enhanced DNS-RTT-DB helps a UE or 416 determine whether to switch to the interface with the smallest RTT. FIG. 9 is an illustration of an enhanced round trip time (RTT) database 900, in accordance with various aspects of the present disclosure.

Without contextual awareness, the UE 416 will select a wireless link with the smallest RTT regardless of the foreground application quality of service (QoS) specifications or the air interface type. It may be overkill to switch to a link with the smallest RTT value when the foreground application does not need the lower latency. For example, the switch may create an unnecessary service interruption. Blindly switching to a link with a smallest RTT may cost the user. For example, the user may have to pay for a cellular connection data charge when cellular is selected over Wi-Fi.

According to an aspect of the present disclosure, a UE 416 selects the RTT value (e.g., air interface) that best matches foreground application quality of service (QoS) specifications and air interface cost optimization. For example, the user can web browse when the public Wi-Fi has a larger RTT than a cellular RTT. In this example, the UE does not switch to cellular based on context aware information. In this example, the UE knows the user is roaming outside of his "home" network and the data surcharge will be prohibitive.

According to another aspect of the present disclosure, a delay in intersystem handoff and service interruption can be reduced. In this example, every morning, the user listens to a stock market update during breakfast and the user continues to listen to the market update while commuting to work. Based on the contextual awareness information, once the UE detects the user has entered the car, the UE can automatically switch the air interface to cellular (even though the RTT value for home Wi-Fi may be smaller) rather than waiting for the Wi-Fi connection to degrade before switching to cellular. The historical data and connectivity needs of the user can be used to reduce delay for the end users. The device can learn about the user connectivity environment and needs based on the RTT latency historical data captured over time and select the first interface based on the prediction while waiting for the RTT live measurement.

The idea of maintaining the latency history over time in the database discussed with reference to FIG. 3 (DNS-RTT-DB) can be extended to record additional parameters for contextual awareness, as seen for example in FIG. 9. Such additional parameters include GPS location of the UE at the time of a DNS request, service set identifier (SSID) of connected Wi-Fi networks at the time of the request, carrier information of cellular networks, the foreground application running at that time, the application type, the application inference, the user state, whether the UE 416 is indoors or outdoors, etc.

Inference may be exercised by an application. For example, WhatsApp® is capable of video calls, audio calls, chat, video streaming, video playback, audio streaming, audio playback, embedded maps, etc. Similarly, mobile games allow the following activities: playing games, in-game chatting, video calling, browsing, etc. A service can look at the active applications and infer the active use case the application is engaging in. That inference is populated in the DNS-RTT-DB.

As noted above, the RTTs over available interfaces with the additional contextual data can be used to learn the user's network interaction relative to time and location. This can expedite a user's connection to a network. For example, the DNS-RTT-DB can be used to learn the best Wi-Fi SSID at a given time and location via machine learning techniques. The DNS-RTT-DB can also help decide the best subscriber identity module (SIM) or carrier to use at a given location and time. The DNS-RTT-DB can be used to decrease the number of additional DNS queries generated for calculating RTT. The device can learn about the user connectivity environment and needs based on the RTT latency historical data captured over time and make the first interface selection based on the prediction while waiting for live RTT measurements.

Figure 10:
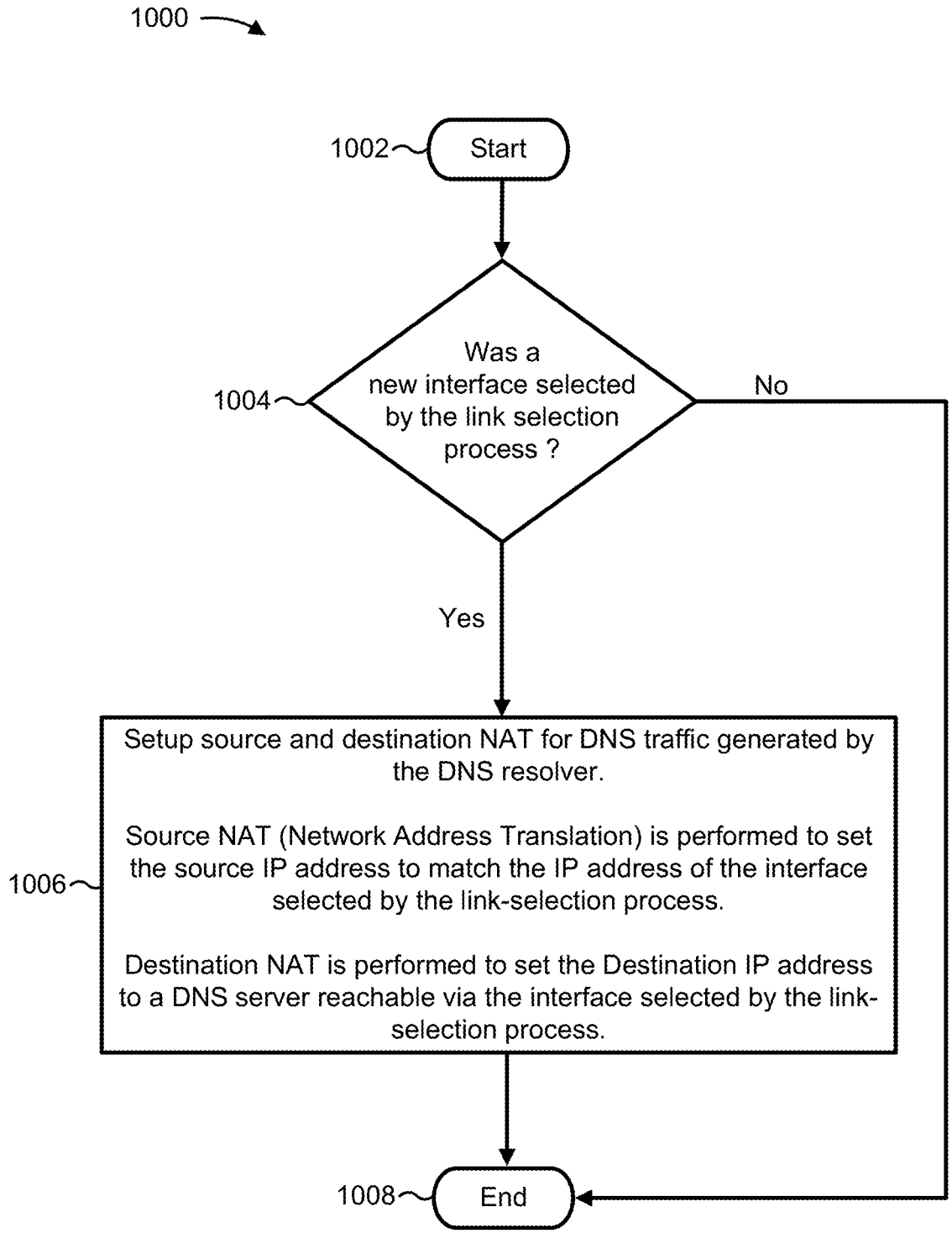
FIG. 10 is a flow diagram of a domain name service (DNS) traffic rerouting process using a local domain name service (DNS) server, in accordance with various aspects of the present disclosure.

While using a global DNS server, such as the global DNS server 502 in FIG. 5 may provide acceptable latency, using a global DNS server may not be preferable. In some cases, using a global DNS server may result in increased cost. When a new interface is added, destination mapping can be used to connect to a local DNS server, such as the DNS servers 408 and 410 in FIG. 4. Destination mapping can be used as long as the local DNS server has a specific, reachable address. FIG. 10 shows a rerouting process using a local DNS server.

FIG. 10 is a flow diagram of a domain name service (DNS) traffic rerouting process using a local domain name service (DNS) server, in accordance with various aspects of the present disclosure. The method 1000 provides for DNS traffic rerouting using a local DNS (e.g., 408 and 410). The method 1000 begins in block 1002 with the start block. Then in block 1004 a determination is made: was a new interface selected by the link selection process? If the answer is yes, the method proceeds to block 1006. If the answer is no, the method ends in block 1008. In block 1006 source network address translation (NAT) is performed to set the source IP address to match the IP address of the interface selected by the link selection process. Destination NAT is performed to set the destination IP address to a DNS server reachable via the interface selected by the link selection process. At block 1008 the process ends.

Figure 11:
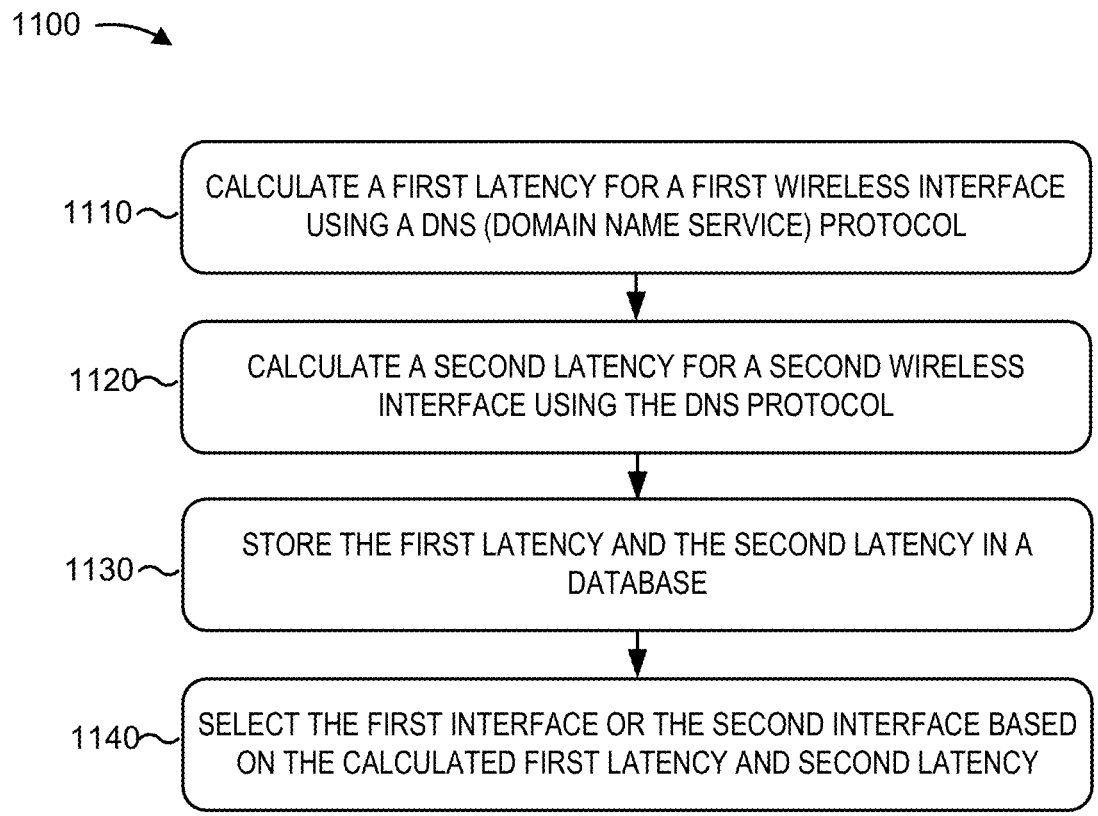
FIG. 11 is a flow diagram illustrating an example process performed, for example, by a user equipment (UE), in accordance with various aspects of the present disclosure.

FIG. 11 is a diagram illustrating an example process 1100 performed, for example, by a user equipment, in accordance with various aspects of the present disclosure. The example process 1100 is an example of an interface selection process using domain name service (DNS) round trip time (RTT). As shown in FIG. 11, in some aspects, the process 1100 may include calculating a first latency for a first wireless interface using a DNS (domain name service) protocol, in block 1110. For example, the UE 416 (e.g., using the antenna 252, DEMOD/MOD 254, receive processor 258, transmit processor 264, controller/processor 280, memory 282, and/or the like) can calculate the first latency. The process 1100 may include calculating a second latency for a second wireless interface using the DNS protocol, in block 1120. For example, the UE 416 (e.g., using the antenna 252, DEMOD/MOD 254, receive processor 258, transmit processor 264, controller/processor 280, memory 282, and/or the like) can calculate the second latency.

As shown in FIG. 11, in some aspects, the process 1100 may include storing the first latency and the second latency in a database, in block 1130. For example, the UE 416 (e.g., using the controller/processor 280, memory 282, and/or the like) can store the first latency and the second latency. The process 1100 may include selecting the first interface or the second interface based on the calculated first latency and second latency, in block 1140. For example, the UE 416 (e.g., using the controller/processor 280, memory 282, and/or the like) can select the first interface or the second interface.

Figure 12:
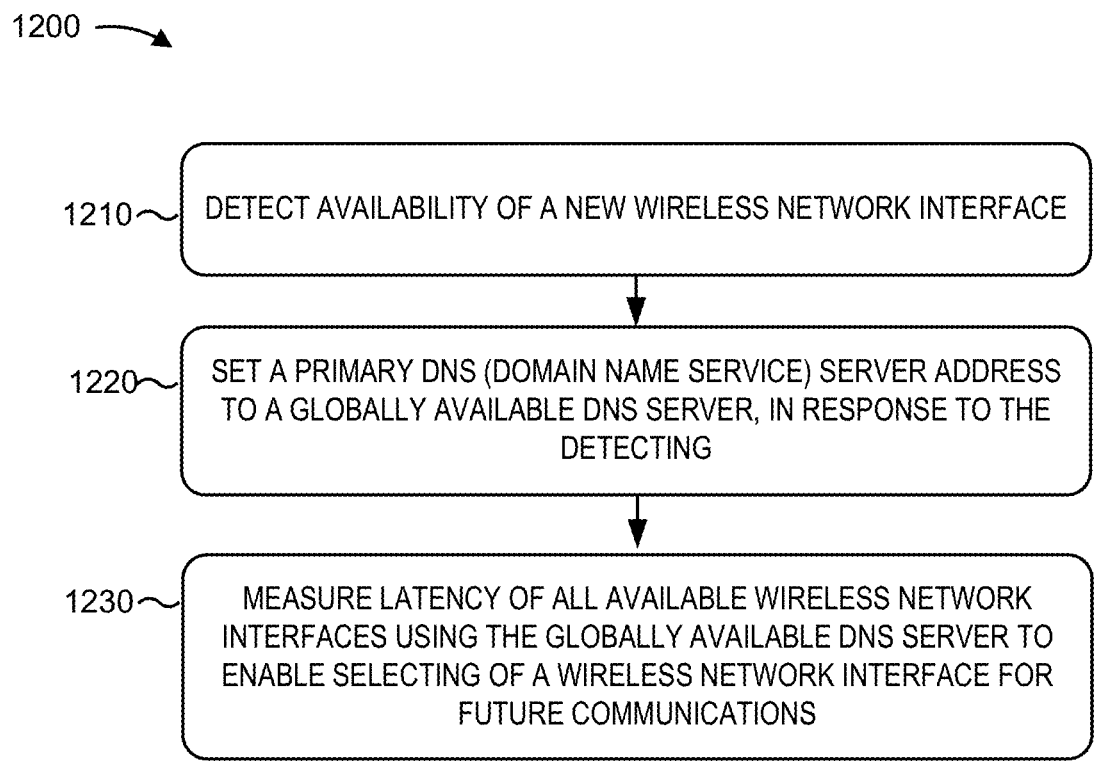
FIG. 12 is a flow diagram illustrating another example process performed, for example, by a user equipment (UE), in accordance with various aspects of the present disclosure.

FIG. 12 is a diagram illustrating an example process 1200 performed, for example, by a user equipment user interface, in accordance with various aspects of the present disclosure. The example process 1200 is an example of domain name service (DNS) traffic rerouting for interface selection. As shown in FIG. 12, in some aspects, the process 1200 may include detecting availability of a new wireless network interface, in block 1210. For example, the UE 416 (e.g., using the antenna 252, DEMOD/MOD 254, receive processor 258, transmit processor 264, controller/processor 280, memory 282, and/or the like) can detect the availability. In some aspects, the process 1200 may include setting a primary DNS (domain name service) server address to a globally available DNS server, in response to the detecting, in block 1220. For example, the UE 416 (e.g., using the controller/processor 280, memory 282, and/or the like) can set a primary DNS (domain name service) server address.

As shown in FIG. 12, in some aspects, the process 1200 may include measuring latency of all available wireless network interfaces using the globally available DNS server to enable selecting of a wireless network interface for future communications, in block 1230. For example, the UE 416 (e.g., using the antenna 252, DEMOD/MOD 254, receive processor 258, transmit processor 264, controller/processor 280, memory 282, and/or the like) can measure latency of all available wireless network interfaces to enable selecting of a wireless network interface for future communications.

Figure 13:
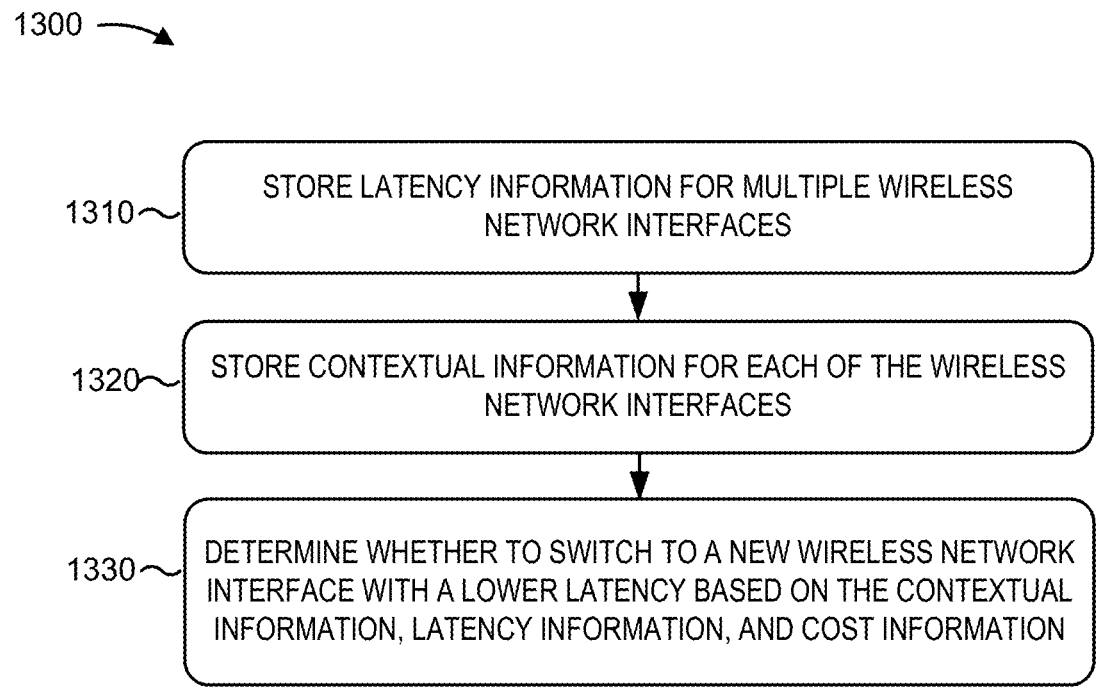
FIG. 13 is a flow diagram illustrating yet another example process performed, for example, by a user equipment (UE), in accordance with various aspects of the present disclosure

FIG. 13 is a diagram illustrating an example process 1300 performed, for example, by a UE (e.g., user interface), in accordance with various aspects of the present disclosure. The example process 1300 is an example of contextually aware interface selection using domain name service (DNS) round trip time (RTT). As shown in FIG. 13, in some aspects, the process 1300 may include storing latency information for multiple wireless network interfaces, in block 1310. For example, the UE 416 (e.g., using the controller/processor 280, memory 282, and/or the like) can store the latency information. The process 1300 may include storing contextual information for each of the wireless network interfaces, in block 1320. For example, the UE 416 (e.g., using the controller/processor 280, memory 282, and/or the like) can store the contextual information.

As shown in FIG. 13, in some aspects, the process 1300 may include determining whether to switch to a new wireless network interface with a lower latency based on the contextual information, the latency information, and cost information, in block 1330. For example, the UE 416 (e.g., using the controller/processor 280, memory 282, and/or the like) can determine whether to switch to a new wireless network interface with a lower latency.

Figure 14:
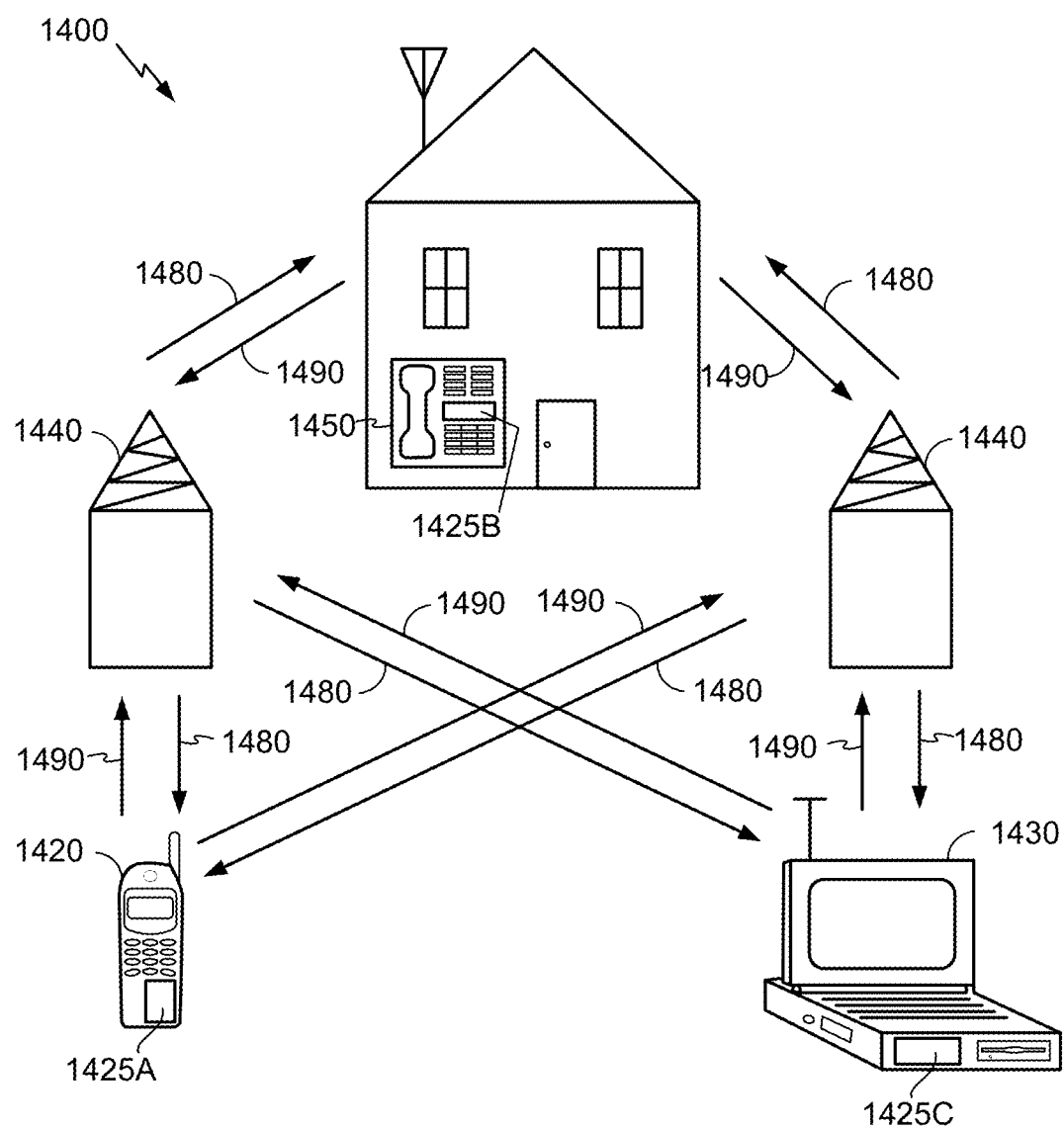
FIG. 14 is a block diagram showing an exemplary wireless communications system in which a configuration of the disclosure may be advantageously employed.

FIG. 14 is a block diagram showing an exemplary wireless communications system in which a configuration of the disclosure may be advantageously employed. FIG. 14 is a block diagram showing an exemplary wireless communications system in which a configuration of the disclosure may be advantageously employed. For purposes of illustration, FIG. 14 shows three remote units 1420, 1430, and 1450, and two base stations 1440. It will be recognized that wireless communications systems may have many more remote units and base stations. Remote units 1420, 1430, and 1450 include IC devices 1425A, 1425B, and 1425C that include the disclosed interface selection using domain name service (DNS) described above It will be recognized that other devices may also include the disclosed interface selection, such as the base stations, switching devices, and network equipment.

FIG. 14 shows forward link signals 1480 from the base stations 1440 to the remote units 1420, 1430, and 1450, and reverse link signals 1490 from the remote units 1420, 1430, and 1450 to base stations 1440. In FIG. 14, remote unit 1420 is shown as a mobile telephone, remote unit 1430 is shown as a portable computer, and remote unit 1450 is shown as a fixed location remote unit in a wireless local loop system. For example, a remote unit may be a mobile phone, a hand-held personal communications systems (PCS) unit, a portable data unit such as a personal digital assistant (PDA), a GPS enabled device, a navigation device, a set top box, a music player, a video player, an entertainment unit, a fixed location data unit such as meter reading equipment, or other communications device that stores or retrieves data or computer instructions, or combinations thereof. Although FIG. 13 illustrates remote units according to the aspects of the present disclosure, the disclosure is not limited to these exemplary illustrated units. Aspects of the disclosure may be suitably employed in many devices, which include the user equipment (UE) described above.

Implementation examples are described in the following numbered clauses.

1. A method of wireless communication, by a UE (user equipment), comprising:
    calculating a first latency for a first wireless interface using a DNS (domain name service) protocol;
    calculating a second latency for a second wireless interface using the DNS protocol;
    storing the first latency and the second latency in a database; and
    selecting the first wireless interface or the second wireless interface based on the calculated first latency and second latency.
2. The method of clause 1, in which calculating the first latency comprises:
    sending a DNS query;
    receiving a response to the DNS query; and
    calculating the first latency as a round trip time (RTT) based on a time when the DNS query was sent and a time when the response was received.
3. The method of clauses 1 or 2, in which sending comprises sending the DNS query to a local DNS server.
4. The method of clauses 1 or 2, in which sending comprises sending the DNS query to a globally available DNS server.
5. The method of any of the preceding clauses, in which storing further comprises storing a position location of the UE when sending the DNS query, a time of sending the DNS query, an identifier (ID) of the first wireless interface and an identifier (ID) of the second wireless interface.
6. The method of any of the preceding clauses, further comprising:
    setting up source and destination network address translation (NAT) for DNS traffic generated by a DNS resolver;
    determining if a new wireless interface has been selected;
    performing a source NAT if the new wireless interface has been selected;
    setting a source internet protocol (IP) address to match an IP address of the selected new wireless interface; and
    performing a destination NAT to set a destination IP address to a DNS server reachable by the selected new wireless interface.
7. The method of any of the preceding clauses, further comprising:
    detecting availability of a new wireless interface, prior to calculating the second latency; and
    setting a primary DNS (domain name service) server address to a globally available DNS server, in response to the detecting, and prior to the selecting.
8. The method of any of clauses 1-6, further comprising:
    detecting availability of a new wireless network interface;
    setting a primary DNS (domain name service) server address to a globally available DNS server, in response to the detecting; and
    measuring latency of all available wireless network interfaces using the globally available DNS server to enable selecting of a wireless network interface for future communications.
9. The method of any of the preceding clauses, further comprising:
    storing latency information for a plurality of wireless network interfaces;
    storing contextual information for each of the plurality of wireless network interfaces; and
    determining whether to switch to a new wireless network interface with a lower latency based on the contextual information, the latency information, and cost information.
10. A UE (user equipment) for wireless communication, comprising:
    a memory, and
    at least one processor operatively coupled to the memory, the memory and the at least one processor configured:
    to calculate a first latency for a first wireless interface using a DNS (domain name service) protocol;
    to calculate a second latency for a second wireless interface using the DNS protocol;
    to store the first latency and the second latency in a database; and
    to select the first wireless interface or the second wireless interface based on the calculated first latency and second latency.
11. The UE of clause 10, in which the at least one processor is further configured to calculate the first latency by:
    sending a DNS query;
    receiving a response to the DNS query; and calculating the first latency as a round trip time (RTT) based on a time when the DNS query was sent and a time when the response was received.

12. The UE of clauses 10 or 11, in which the at least one processor is further configured to send the DNS query to a local DNS server.

13. The UE of clauses 10 or 11, in which the at least one processor is further configured to send the DNS query to a globally available DNS server.

14. The UE of any of the preceding clauses, in which the at least one processor is further configured to store a position location of the UE when sending the DNS query, a time of sending the DNS query, an ID of the first wireless interface and an ID of the second wireless interface.

15. The UE of any of the preceding clauses, in which the at least one processor is further configured:
    to set up source and destination network address translation (NAT) for DNS traffic generated by a DNS resolver;
    to determine if a new wireless interface has been selected;
    to perform a source NAT if the new wireless interface has been selected;
    to set a source internet protocol (IP) address to match an IP address of the selected new wireless interface; and
    to perform a destination NAT to set a destination IP address to a DNS server reachable by the selected new wireless interface.

16. The UE of any of the preceding clauses, in which the at least one processor is further configured:
    to detect availability of a new wireless interface, prior to calculating the second latency; and
    to set a primary DNS (domain name service) server address to a globally available DNS server, in response to the detecting, and prior to the selecting.

17. The UE of any of the preceding clauses, in which the at least one processor is further configured:
    to detect availability of a new wireless network interface;
    to set a primary DNS (domain name service) server address to a globally available DNS server, in response to the detecting; and
    to measure latency of all available wireless network interfaces using the globally available DNS server to enable selecting of a wireless network interface for future communications.

18. The UE of any of the clauses 10-16, in which the at least one processor is further configured:
    to store latency information for a plurality of wireless network interfaces;
    to store contextual information for each of the plurality of wireless network interfaces; and
    to determine whether to switch to a new wireless network interface with a lower latency based on the contextual information, the latency information, and cost information.

19. A UE (user equipment) for wireless communication, comprising:
    means for calculating a first latency for a first wireless interface using a DNS (domain name service) protocol;
    means for calculating a second latency for a second wireless interface using the DNS protocol;
    means for storing the first latency and the second latency in a database; and
    means for selecting the first wireless interface or the second wireless interface based on the calculated first latency and second latency.

20. The UE of clause 19, in which calculating the first latency comprises:
    means for sending a DNS query;
    means for receiving a response to the DNS query; and
    means for calculating the first latency as a round trip time (RTT) based on a time when the DNS query was sent and a time when the response was received.

21. The UE of clauses 19 or 20, in which the means for sending comprises means for sending the DNS query to a local DNS server.

22. The UE of clauses 19 or 20, in which the means for sending comprises means for sending the DNS query to a globally available DNS server.

23. The UE of any of the preceding clauses, in which the means for storing further comprises means for storing a position location of the UE when sending the DNS query, a time of sending the DNS query, an ID of the first wireless interface and an ID of the second wireless interface.

24. The UE of any of the preceding clauses, further comprising:
    means for setting up source and destination network address translation (NAT) for DNS traffic generated by a DNS resolver;
    means for determining if a new wireless interface has been selected;
    means for performing a source NAT if the new wireless interface has been selected;
    means for setting a source internet protocol (IP) address to match an IP address of the selected new wireless interface; and
    means for performing a destination NAT to set a destination IP address to a DNS server reachable by the selected new wireless interface.

25. The UE of any of the preceding clauses, further comprising:
    means for detecting availability of a new wireless interface, prior to calculating the second latency; and
    means for setting a primary DNS (domain name service) server address to a globally available DNS server, in response to the detecting, and prior to the selecting.

26. The UE of any of the clauses 19-24, further comprising:
    means for detecting availability of a new wireless network interface;
    means for setting a primary DNS (domain name service) server address to a globally available DNS server, in response to the detecting; and
    means for measuring latency of all available wireless network interfaces using the globally available DNS server to enable selecting of a wireless network interface for future communications.

27. The UE of any of the preceding clauses, further comprising:
    means for storing latency information for a plurality of wireless network interfaces;
    means for storing contextual information for each of the plurality of wireless network interfaces; and
    means for determining whether to switch to a new wireless network interface with a lower latency based on the contextual information, the latency information, and cost information.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used in this document, a processor is implemented in hardware, firmware, and/or a combination of hardware and software.

Some aspects are described in this document in connection with thresholds. As used in this document, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described in this document may be implemented in different forms of hardware, firmware, and/or a combination of hardware and software. The actual specialized control hardware or software code used to implement these systems and/or methods is not limiting of the aspects. Thus, the operation and behavior of the systems and/or methods were described in this document without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used in this document should be construed as critical or essential unless explicitly described as such. Also, as used in this document, the articles "a" and "an" are intended to include one or more items, and may be used interchangeably with "one or more." Furthermore, as used in this document, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used in this document, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a UE (user equipment), comprising:
   calculating a first latency for a first wireless interface using a DNS (domain name service) protocol query request/response handshake, the first latency corresponding to the first wireless interface between the UE and a first DNS server;
   calculating a second latency for a second wireless interface using the DNS protocol query request/response handshake, the second latency corresponding to the second wireless interface between the UE and a second DNS server;
   storing the first latency and the second latency in a database;
   selecting the first wireless interface or the second wireless interface as a selected wireless interface, based on the calculated first latency and second latency; and
   communicating, over the selected wireless interface, with an application server that is different from the first DNS server and the second DNS server, based on the selecting.

2. The method of claim 1, in which calculating the first latency comprises:
   sending a DNS query;
   receiving a response to the DNS query; and
   calculating the first latency as a round trip time (RTT) based on a time when the DNS query was sent and a time when the response was received.

3. The method of claim 2, in which sending comprises sending the DNS query to a local DNS server comprising the first DNS server.

4. The method of claim 2, in which sending comprises sending the DNS query to a globally available DNS server comprising the first DNS server.

5. The method of claim 2, in which storing further comprises storing a position location of the UE when sending the DNS query, a time of sending the DNS query, an identifier (ID) of the first wireless interface and an identifier (ID) of the second wireless interface.

6. The method of claim 1, further comprising;
   setting up source and destination network address translation (NAT) for DNS traffic generated by a DNS resolver;
   determining if a new wireless interface has been selected;
   performing a source NAT if the new wireless interface has been selected;
   setting a source internet protocol (IP) address to match an IP address of the selected new wireless interface; and
   performing a destination NAT to set a destination IP address to a DNS server reachable by the selected new wireless interface.

7. The method of claim 1, further comprising:
   detecting availability of a new wireless interface, prior to calculating the second latency; and
   setting a primary DNS (domain name service) server address to a globally available DNS server, in response to the detecting, and prior to the selecting.

8. The method of claim 1, further comprising:
   detecting availability of a new wireless network interface;
   setting a primary DNS (domain name service) server address to a globally available DNS server, in response to the detecting; and
   measuring latency of all available wireless network interfaces using the globally available DNS server to enable selecting of a wireless network interface for future communications.

9. The method of claim 1, further comprising:
   storing latency information for a plurality of wireless network interfaces;
   storing contextual information for each of the plurality of wireless network interfaces; and determining whether to switch to a new wireless network interface with a lower latency based on the contextual information, the latency information, and cost information.

10. A UE (user equipment) for wireless communication, comprising:
a memory, and
at least one processor operatively coupled to the memory, the memory and the at least one processor configured:
to calculate a first latency for a first wireless interface using a DNS (domain name service) protocol query request/response handshake, the first latency corresponding to the first wireless interface between the UE and a first DNS server;
to calculate a second latency for a second wireless interface using the DNS protocol query request/response handshake, the second latency corresponding to the second wireless interface between the UE and a second DNS server;
to store the first latency and the second latency in a database;
to select the first wireless interface or the second wireless interface as a selected wireless interface, based on the calculated first latency and second latency; and
to communicate, over the selected wireless interface, with an application server that is different from the first DNS server and the second DNS server, based on the selecting.

11. The UE of claim 10, in which the at least one processor is further configured to calculate the first latency by:
sending a DNS query;
receiving a response to the DNS query; and
calculating the first latency as a round trip time (RTT) based on a time when the DNS query was sent and a time when the response was received.

12. The UE of claim 11, in which the at least one processor is further configured to send the DNS query to a local DNS server comprising the first DNS server.

13. The UE of claim 11, in which the at least one processor is further configured to send the DNS query to a globally available DNS server comprising the first DNS server.

14. The UE of claim 11, in which the at least one processor is further configured to store a position location of the UE when sending the DNS query, a time of sending the DNS query, an ID of the first wireless interface and an ID of the second wireless interface.

15. The UE of claim 10, in which the at least one processor is further configured:
to set up source and destination network address translation (NAT) for DNS traffic generated by a DNS resolver;
to determine if a new wireless interface has been selected;
to perform a source NAT if the new wireless interface has been selected;
to set a source internet protocol (IP) address to match an IP address of the selected new wireless interface; and
to perform a destination NAT to set a destination IP address to a DNS server reachable by the selected new wireless interface.

16. The UE of claim 10, in which the at least one processor is further configured:
to detect availability of a new wireless interface, prior to calculating the second latency; and
to set a primary DNS (domain name service) server address to a globally available DNS server, in response to the detecting, and prior to the selecting.

17. The UE of claim 10, in which the at least one processor is further configured:
to detect availability of a new wireless network interface;
to set a primary DNS (domain name service) server address to a globally available DNS server, in response to the detecting; and
to measure latency of all available wireless network interfaces using the globally available DNS server to enable selecting of a wireless network interface for future communications.

18. The UE of claim 10, in which the at least one processor is further configured:
to store latency information for a plurality of wireless network interfaces;
to store contextual information for each of the plurality of wireless network interfaces; and
to determine whether to switch to a new wireless network interface with a lower latency based on the contextual information, the latency information, and cost information.

19. A UE (user equipment) for wireless communication, comprising:
means for calculating a first latency for a first wireless interface using a DNS (domain name service) protocol query request/response handshake, the first latency corresponding to the first wireless interface between the UE and a first DNS server;
means for calculating a second latency for a second wireless interface using the DNS protocol query request/response handshake, the second latency corresponding to the second wireless interface between the UE and a second DNS server;
means for storing the first latency and the second latency in a database;
means for selecting the first wireless interface or the second wireless interface as a selected wireless interface, based on the calculated first latency and second latency; and
means for communicating, over the selected wireless interface, with an application server that is different from the first DNS server and the second DNS server, based on the selecting.

20. The UE of claim 19, in which calculating the first latency comprises:
means for sending a DNS query;
means for receiving a response to the DNS query; and
means for calculating the first latency as a round trip time (RTT) based on a time when the DNS query was sent and a time when the response was received.

21. The UE of claim 20, in which the means for sending comprises means for sending the DNS query to a local DNS server comprising the first DNS server.

22. The UE of claim 20, in which the means for sending comprises means for sending the DNS query to a globally available DNS server comprising the first DNS server.

23. The UE of claim 20, in which the means for storing further comprises means for storing a position location of the UE when sending the DNS query, a time of sending the DNS query, an ID of the first wireless interface and an ID of the second wireless interface.

24. The UE of claim 19, further comprising:
means for setting up source and destination network address translation (NAT) for DNS traffic generated by a DNS resolver;

means for determining if a new wireless interface has been selected;
means for performing a source NAT if the new wireless interface has been selected;
means for setting a source internet protocol (IP) address to match an IP address of the selected new wireless interface; and
means for performing a destination NAT to set a destination IP address to a DNS server reachable by the selected new wireless interface.

25. The UE of claim 19, further comprising:
means for detecting availability of a new wireless interface, prior to calculating the second latency; and
means for setting a primary DNS (domain name service) server address to a globally available DNS server, in response to the detecting, and prior to the selecting.

26. The UE of claim 19, further comprising:
means for detecting availability of a new wireless network interface;
means for setting a primary DNS (domain name service) server address to a globally available DNS server, in response to the detecting; and
means for measuring latency of all available wireless network interfaces using the globally available DNS server to enable selecting of a wireless network interface for future communications.

27. The UE of claim 19, further comprising:
means for storing latency information for a plurality of wireless network interfaces;
means for storing contextual information for each of the plurality of wireless network interfaces; and
means for determining whether to switch to a new wireless network interface with a lower latency based on the contextual information, the latency information, and cost information.

28. A non-transitory computer-readable medium having program code recorded thereon, the program code executed by one or more processors and comprising:
program code to calculate a first latency for a first wireless interface using a DNS (domain name service) protocol query request/response handshake, the first latency corresponding to the first wireless interface between the UE and a first DNS server;
program code to calculate a second latency for a second wireless interface using the DNS protocol query request/response handshake, the second latency corresponding to the second wireless interface between the UE and a second DNS server;
program code to store the first latency and the second latency in a database;
program code to select the first wireless interface or the second wireless interface as a selected wireless interface, based on the calculated first latency and second latency; and
program code to communicate, over the selected wireless interface, with an application server that is different from the first DNS server and the second DNS server, based on the selecting.

* * * * *